United States Patent
Harmon et al.

(10) Patent No.: US 11,772,468 B2
(45) Date of Patent: Oct. 3, 2023

(54) CARGO BED COVERING AND ENCLOSING ASSEMBLY

(71) Applicant: Ford Global Technologies, LLC, Dearborn, MI (US)

(72) Inventors: Michael John Harmon, Northville, MI (US); Ryan Mathew Sandor, North Wales, PA (US); Amol Borkar, Nagpur (IN); Ronald Meredith, Waterford, MI (US); Martyn Swain, Ann Arbor, MI (US); Scott Culver Anderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 17/673,852

(22) Filed: Feb. 17, 2022

(65) Prior Publication Data

US 2023/0256799 A1    Aug. 17, 2023

(51) Int. Cl.
*B60J 7/14* (2006.01)
*B60J 7/16* (2006.01)
*B62D 33/027* (2006.01)

(52) U.S. Cl.
CPC ............. *B60J 7/141* (2013.01); *B60J 7/1607* (2013.01); *B62D 33/027* (2013.01)

(58) Field of Classification Search
CPC ........ B60J 7/141; B60J 7/1607; B62D 33/027
USPC ............. 296/100.01, 100.02, 100.06, 100.09
See application file for complete search history.

(56) References Cited

U.S. PATENT DOCUMENTS

| | | | | |
|---|---|---|---|---|
| 5,456,511 | A * | 10/1995 | Webber | B60P 1/00 296/57.1 |
| 5,669,654 | A * | 9/1997 | Eilers | B60P 1/003 296/26.11 |
| 6,186,575 | B1 * | 2/2001 | Fisher | B62D 47/003 296/37.6 |
| 6,367,858 | B1 * | 4/2002 | Bradford | B60P 3/40 296/26.11 |
| 6,561,560 | B2 | 5/2003 | Brown et al. | |
| 6,648,569 | B2 | 11/2003 | Douglass et al. | |
| 6,948,763 | B2 | 9/2005 | Robbins | |
| 7,232,172 | B2 * | 6/2007 | Kiester | B60P 7/14 296/26.08 |
| 10,239,567 | B1 * | 3/2019 | Parrish | B62D 33/08 |
| 10,532,683 | B1 * | 1/2020 | Bowman | B60P 1/003 |
| 11,059,423 | B1 * | 7/2021 | Weaver | B62D 33/027 |
| 11,110,971 | B2 | 9/2021 | Singer | |
| 2005/0189778 | A1 * | 9/2005 | De Gaillard | B60P 3/40 296/50 |
| 2010/0140973 | A1 | 6/2010 | Duncan | |
| 2012/0325877 | A1 | 12/2012 | Franks | |

(Continued)

*Primary Examiner* — Jason S Daniels
(74) *Attorney, Agent, or Firm* — Vichit Chea; Carlson, Gaskey & Olds, P.C.

(57) ABSTRACT

A vehicle assembly includes a cargo bed cover that covers a cargo bed of a vehicle when the cargo bed is in a standard bed position. The cargo bed cover is configured to provide an aft wall of the cargo bed when the cargo bed is in an extended bed position. A cargo bed providing method includes transitioning a cargo bed from a standard bed position to an extended bed position, and enclosing an aft end of the cargo bed with a cargo bed cover that covers the cargo bed when the cargo bed is in the standard bed position.

18 Claims, 3 Drawing Sheets

(56) References Cited

U.S. PATENT DOCUMENTS

| | | | |
|---|---|---|---|
| 2017/0246980 A1* | 8/2017 | Rodriguez, Jr. | B62D 33/08 |
| 2021/0188368 A1* | 6/2021 | Williams | B60P 3/40 |

\* cited by examiner

CARGO BED COVERING AND ENCLOSING ASSEMBLY

TECHNICAL FIELD

This disclosure relates generally to a cover for a cargo bed that can be extended and, more particularly, to a cover that can be used to enclose an aft end of the cargo bed in an extended position.

BACKGROUND

Some vehicles, such as pickup trucks, include a cargo bed. Users utilize cargo beds to carry various types of cargo. The cargo bed can be located behind a passenger compartment of the vehicle. A tailgate can enclose an aft end of the cargo bed.

SUMMARY

In some aspects, the techniques described herein relate to a vehicle assembly, including: a cargo bed cover that covers a cargo bed of a vehicle when the cargo bed is in a standard bed position, the cargo bed cover configured to provide an aft wall of the cargo bed when the cargo bed is in an extended bed position.

In some aspects, the techniques described herein relate to a vehicle assembly, further including the cargo bed configured to transition back-and-forth between a standard bed position and an extended bed position.

In some aspects, the techniques described herein relate to a vehicle assembly, wherein a tailgate assembly in a closed position provides an aft wall of the cargo bed when the cargo bed is in the standard bed position, wherein the tailgate in an open position provides a portion of a floor of the cargo bed when the cargo bed is in the extended bed position.

In some aspects, the techniques described herein relate to a vehicle assembly, further including first and second side wall assemblies of the cargo bed, the side wall assemblies each including an extendible portion and a fixed portion, the side wall assemblies each configured to transition back-and-forth between a standard wall position and an extended wall position, wherein the extendible portion of each side wall assembly extends and retracts relative to the corresponding fixed portion when the side wall assembly is transitioned back-and-forth between the standard wall position and the extended wall position.

In some aspects, the techniques described herein relate to a vehicle assembly, further including a first taillight of the extendible portion of the first wall, and a second taillight of the extendable portion of the second wall, wherein the first taillight and the second taillight extend and retract relative to the corresponding fixed portion.

In some aspects, the techniques described herein relate to a vehicle assembly, wherein the extendible portion of the first side wall assembly is telescopically received within the fixed portion of the first side wall assembly when the first side wall is in the standard wall position, wherein the extendible portion of the first side wall is telescopically received within the fixed portion of the first side wall when the first side wall is in the standard wall position.

In some aspects, the techniques described herein relate to a vehicle assembly, wherein the extendible portion of the first and second side wall assemblies, when extended, provide respective side walls of an extended area of the cargo bed when the cargo bed is in the extended bed position.

In some aspects, the techniques described herein relate to a vehicle assembly, wherein the cargo bed cover includes a plurality of covering sections that are pivotably connected to each other, the plurality of covering sections disposed adjacent one another along a longitudinal axis of the vehicle when the cargo bed cover is covering the cargo bed of the vehicle, at least some of the plurality of covering section folded against one another when the cargo bed cover is providing the aft wall of the cargo bed of the vehicle.

In some aspects, the techniques described herein relate to a vehicle assembly, wherein the plurality of covering sections includes at least three covering sections.

In some aspects, the techniques described herein relate to a vehicle assembly, further including the cargo bed and a tailgate assembly, the cargo bed configured to transition back-and-forth between a standard bed position and an extended bed position, a tailgate assembly in a closed position provides an aft wall of the cargo bed when the cargo bed is in the standard bed position, wherein the tailgate in an open position provides a portion of a floor of the cargo bed when the cargo bed is in the extended bed position, wherein at least one of the covering sections is secured directly to the portion of the floor provided by the tailgate when the cargo bed is in the extended bed position.

In some aspects, the techniques described herein relate to a vehicle assembly, wherein the cargo bed cover includes a first flap and a second flap, the first flap providing a driver side wall of an extended area of the cargo bed when the cargo bed is in the extended position, the second flap providing a passenger side wall of the extended area.

In some aspects, the techniques described herein relate to a vehicle assembly, wherein the first flap and the second flap are secured to opposing outboard sides of one of the covering sections.

In some aspects, the techniques described herein relate to a vehicle assembly, wherein the first flap and the second flap are configured to fold over a vertically upward facing surface of one of the covering sections when the cargo bed cover is covering the cargo bed of the vehicle.

In some aspects, the techniques described herein relate to a cargo bed providing method, including: transitioning a cargo bed from a standard bed position to an extended bed position; and enclosing an aft end of the cargo bed with a cargo bed cover that covers the cargo bed when the cargo bed is in the standard bed position.

In some aspects, the techniques described herein relate to a cargo bed providing method, wherein the cargo bed cover is at least partially folded when enclosing the aft end of the cargo bed.

In some aspects, the techniques described herein relate to a cargo bed providing method, further including completely covering the cargo bed with the cargo bed cover when the cargo bed is in the standard bed position.

In some aspects, the techniques described herein relate to a cargo bed providing method, further including extending side walls of the cargo bed during the transitioning, the side walls, when extended, providing respective side walls of an extended area of the cargo bed when the cargo bed is in the extended bed position.

In some aspects, the techniques described herein relate to a cargo bed providing method, further including providing a driver side wall of an extended area of the cargo bed using a first flap of the cargo bed cover, and providing a passenger side wall of the extended area using a second flap of the cargo bed cover.

In some aspects, the techniques described herein relate to a cargo bed providing method, wherein the first flap and the second flap are pivotably connected to a covering section of the cargo bed cover.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle assembly. In particular, an assembly including a cargo bed cover that can be used to cover an extendable cargo bed in a standard bed position, and used to enclose an aft end of the extendable cargo bed in an extended bed position.

Figure 1:
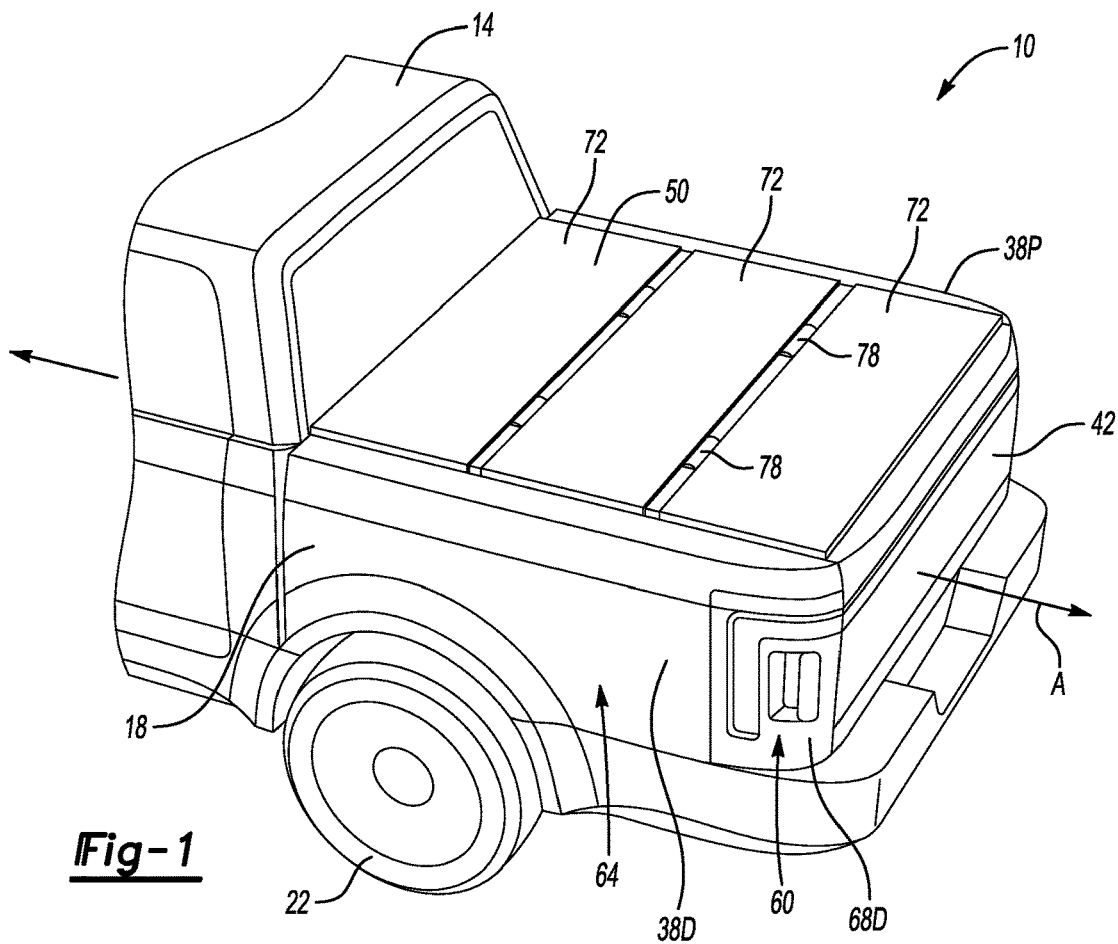
FIG. 1 illustrates a vehicle having a cargo bed in a standard bed position and covered by cargo bed cover according to an exemplary embodiment of the present disclosure.
Figure 2:
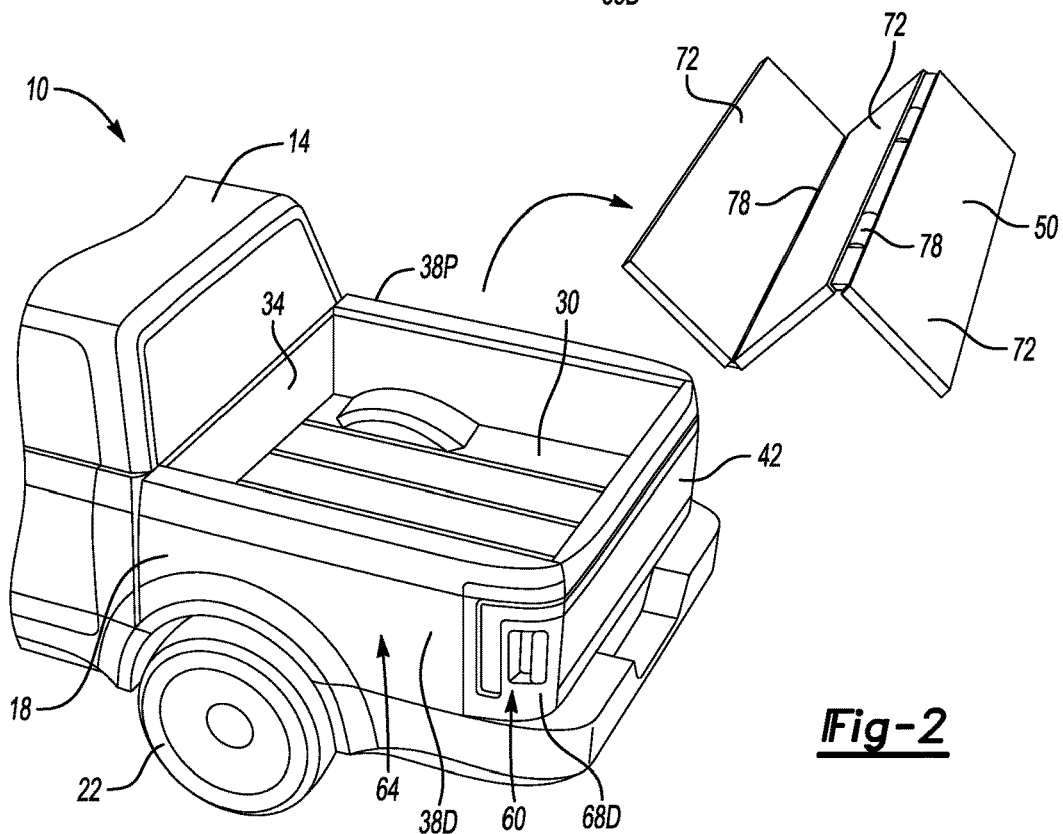
FIG. 2 illustrates the vehicle of FIG. 1 with the cargo bed cover removed.
Figure 3:
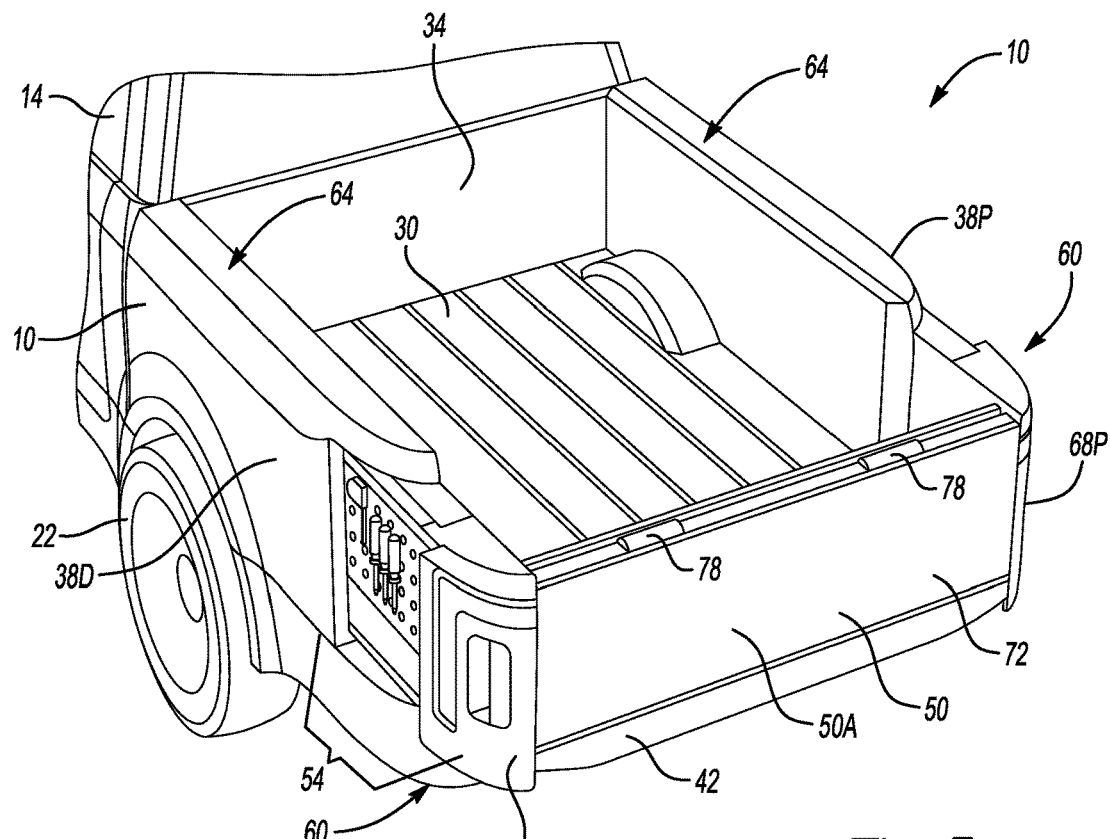
FIG. 3 illustrates the vehicle of FIG. 1 having the cargo bed in an extended bed position with an aft end of the cargo bed enclosed by the cargo bed cover.

With reference to FIGS. 1-3, a vehicle 10 includes a passenger compartment 14 and a cargo bed 18 that is aft the passenger compartment 14 along a longitudinal axis A of the vehicle 10.

In the exemplary embodiment, the vehicle 10 is a pickup truck. The vehicle 10 could be another type of vehicle in another example, such as a car, van, sport utility vehicle, etc. The vehicle 10 has a unibody architecture. In another embodiment, the vehicle 10 could have a body-on-frame architecture.

The example vehicle 10 is an electrified vehicle. In particular, the vehicle 10 is a battery electric vehicle. In another example, the vehicle 10 could be another type of electrified vehicle, such as a plug-in hybrid electric vehicle (PHEV), or a conventional vehicle.

The example vehicle 10 includes an electrified powertrain capable of applying a torque from an electric machine (e.g., an electric motor) to drive one or more drive wheels 22. The vehicle 10 can include a traction battery pack, which powers the electric machine and, potentially, other electrical loads of the vehicle 10. The powertrain of the vehicle 10 may electrically propel the drive wheels 22 either with or without the assistance of an internal combustion engine.

FIG. 1 shows the cargo bed 18 in a standard position. The cargo bed 18 can be transitioned back-and-forth between the standard bed position of FIG. 1 and the extended bed position of FIG. 3. As can be appreciated, the cargo bed 18 in the extended bed position can accommodate more cargo than the cargo bed 18 in the standard bed position. A user can transition the cargo bed 18 to the extended bed position to increase a carrying capacity of the cargo bed 18. When the increased capacity is not required, the user can maintain the cargo bed 18 in the standard bed position, which can, among other things, facilitate maneuverability of the vehicle 10.

Generally, the cargo bed 18 includes a floor assembly 30, a front wall 34, a first side wall assembly 38D on a driver side, a second side wall assembly 38P on a passenger side, and a tailgate assembly 42. In FIG. 1, a cargo bed cover 50 covers the cargo bed 18 of the vehicle 10 when the cargo bed 18 is in the standard bed position. In this example, the cargo bed 18 with the tailgate 42 in the closed position, is completely covered by the cargo bed cover 50. The cargo bed cover 50 can be clamped to the tailgate assembly 42, the first side wall assembly 38D, and the second side wall assembly 38P. The cargo bed cover 50 could be secured in other ways in other examples.

The cover bed cover 50 can be removed from the cargo bed 18 as shown in FIG. 2. The cargo bed cover 50 can be at least partially folded and used to provide an aft wall 50A of the cargo bed 18 when the cargo bed 18 is in the extended position of FIG. 3. When used as the aft wall 50A, the cargo bed cover 50 functions similarly to a traditional tailgate in a closed position, such as the tailgate assembly 42. In this example, the cargo bed cover 50 providing the aft wall 50A fits within respective grooves of the first side wall 38D and the second side wall 38P. The cargo bed cover 50 providing the aft wall 50A could be secured relative to the cargo bed 18 in other ways in other examples.

When the cargo bed 18 is in the standard bed position of FIGS. 1 and 2, the tailgate assembly 42 in a closed position provides an aft wall of the cargo bed 18. In this example, when the cargo bed 18 is in the extended position, the tailgate 42 in an open position provides a portion of a floor of an extended area 54 of the cargo bed 18.

The first side wall assembly 38D and the second side wall assembly 38P are each configured to transition back-and-forth between a standard wall position (FIGS. 1 and 2) and an extended wall position (FIG. 3). The first side wall assembly 38D and the second side wall assembly 38P each include an extendible portion 60 and a fixed portion 64. The extendible portions 60 can extend and retract relative to the respective fixed portions 64. The extendable portions 60 are retracted when the cargo bed 18 is in the standard bed position. The extendable portions 60 are extended when the cargo bed 18 is in the extended bed position.

In this example, the extendible portions 60 are telescopically received within the respective fixed portions 64. Actuators could be used to move the extendible portions 60 back-and-forth between the extended and retracted positions. The actuators could be screw-driven linear actuators, for example. Instead, or additionally, a user could manually move the extendable portions back-and-forth between the extended and retracted positions. The actuators could extend and retract in response to command from a button on the vehicle 10 or an input from a handheld device, such as a smartphone.

Tools and accessories can be stored on the extendible portions. Covers could be used to cover the tools and accessories when the vehicle 10 is operated with the extendible portions 60 in the extended positions.

In this example, the extendible portions 60 of the first and second side wall assemblies 68D, 68P, when extended, provide respective side walls of the extended area 54 of the cargo bed 18 when the cargo bed 18 is in the extended bed position.

A first taillight 68D is part of the extendible portion 60 of the first side wall assembly 38D. A second taillight 68P is part of the extendible portion 60 of the second side wall assembly 38P. The taillights 68D, 68P extend and retract with the corresponding extendible portions 60 of the first and second side wall assemblies 68D, 68P.

In the exemplary embodiment, the cargo bed cover 50 includes a plurality of covering sections 72, here three covering sections 72 are used. The covering sections 72 are pivotably connected to each other using hinges 78, for example.

When covering the cargo bed 18 in the standard bed position, the plurality of covering sections 72 are disposed adjacent one another along the longitudinal axis A of the vehicle 10. When the cargo bed 18 is in the extended bed position and the cargo bed cover 50 is used to provide the aft wall 50A, the covering sections 72 are folded against one another.

Figure 4:
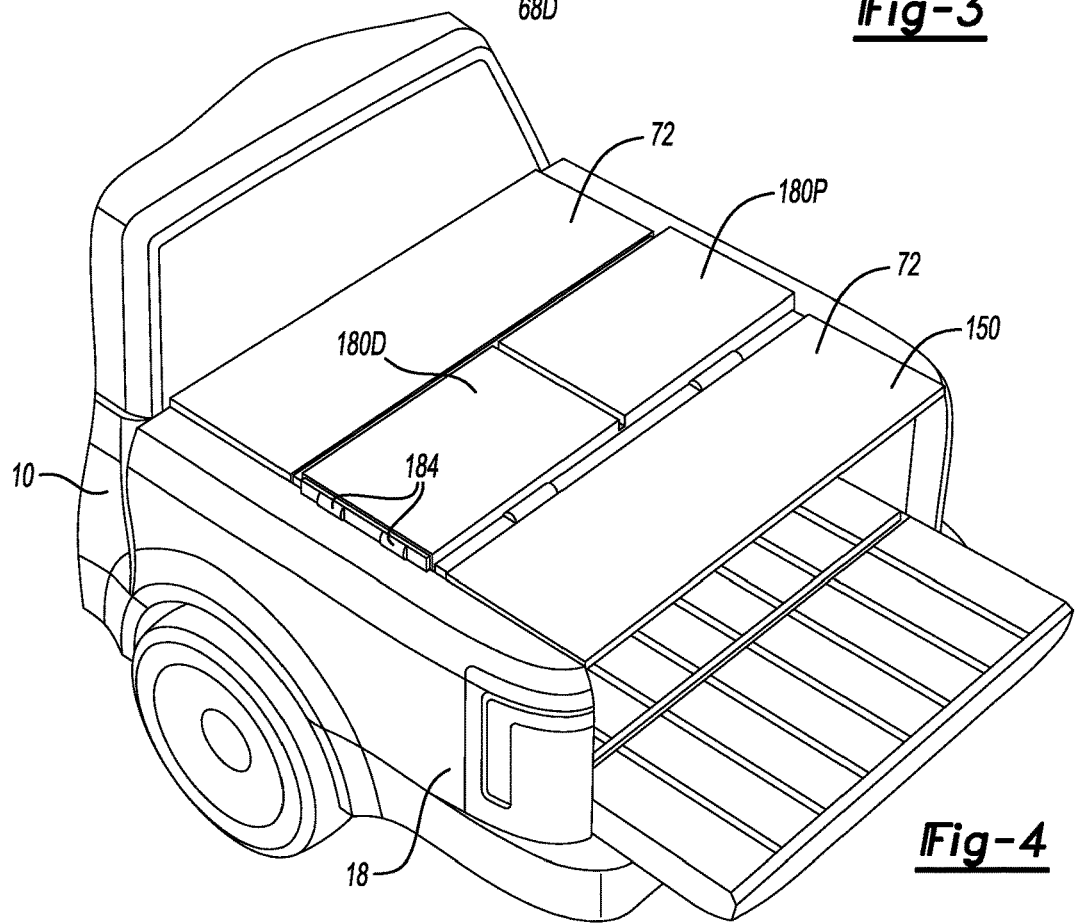
FIG. 4 illustrates the vehicle of FIG. 1 having a cargo bed in a standard bed position and covered by cargo bed cover according to another exemplary embodiment of the present disclosure.
Figure 5:
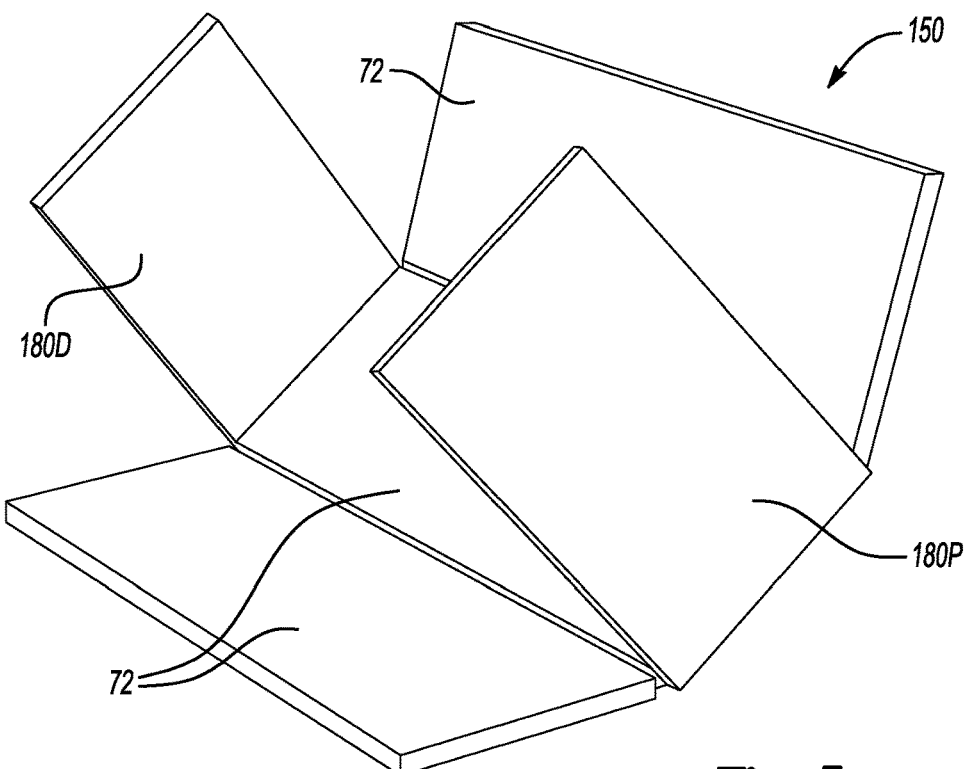
FIG. 5 illustrates the cargo bed cover of FIG. 4.
Figure 6:
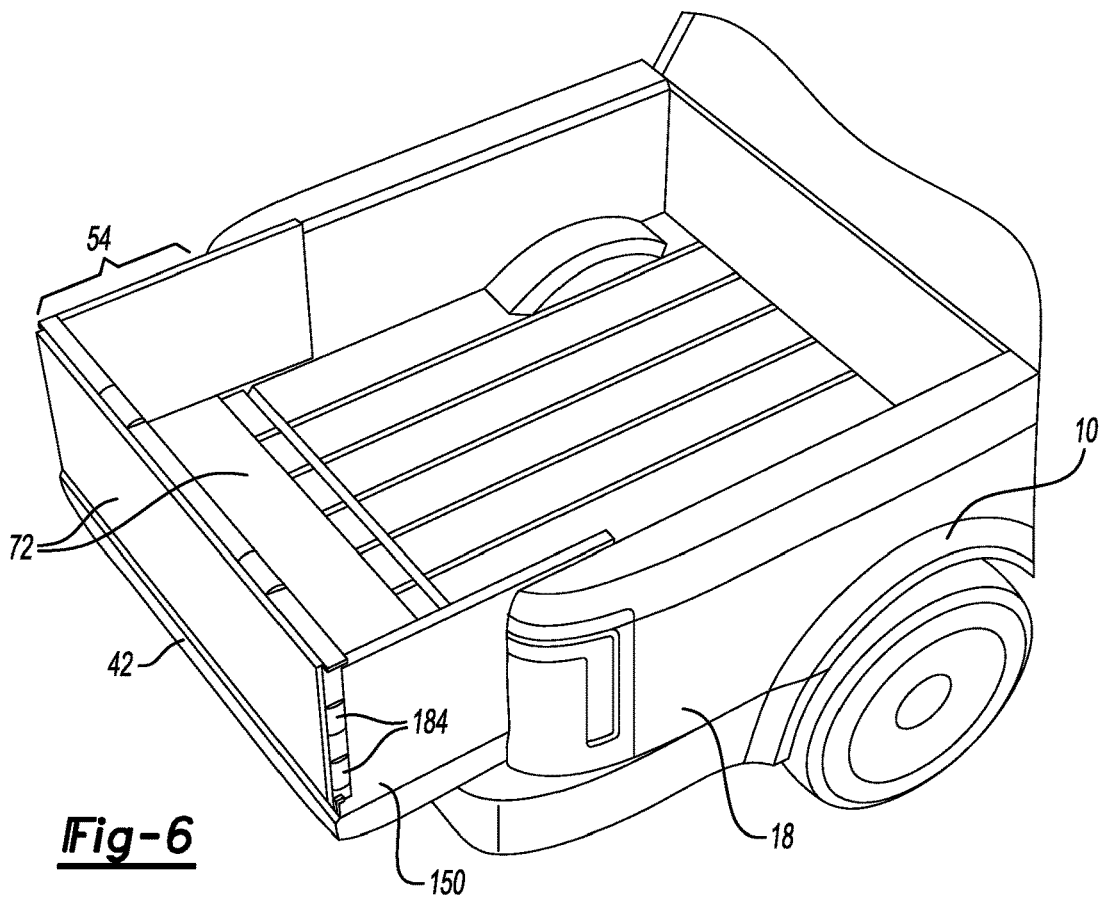
FIG. 6 illustrates the vehicle of FIG. 4 having the cargo bed in an extended bed position with an aft end of the cargo bed enclosed by the cargo bed cover.

FIGS. 4-6 illustrate a cargo bed cover 150 according to another exemplary embodiment. In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The cargo bed cover 150 includes covering sections 72. Three are used in this example. In addition, the cargo bed cover 150 includes a first flap 180D and a second flap 180P. The first flap 180D and the second flap 180P are secured to opposing outboard sides of one of the covering sections 72.

In particular, the first and second flap 180D, 180P are secured to the covering section 72 that is the middle covering section 72 along the longitudinal axis A of the vehicle 10 when the cargo bed cover 150 is covering the cargo bed 18. The first flap 180D and the second flap 180P can be pivotably connected to the covering section 72. Hinges 184 are used to pivotably connect the first flap 180D and the second flap 180P to the covering section 72 in this example.

As shown in FIG. 4, the first flap 180D and the second flap 180P are configured to fold over a vertically upward facing surface of one of the covering sections 72 when the cargo bed cover 150 is covering the cargo bed 18 of the vehicle 10. In this example, the cargo bed 18 with the tailgate 42 in the closed position, is completely covered by the cargo bed cover 150 as shown in FIG. 4.

As shown in FIG. 6, the first flap 180D provides a driver side wall of the extended area 54 of the cargo bed 18 when the cargo bed 18 is in the extended position and the cargo bed cover 150 is providing the aft wall 150A. Further, the second flap 180P provides a passenger side wall of the extended area 54.

In the embodiment of FIGS. 4-6, the tailgate assembly 42 in the closed position (FIG. 4) provides the aft wall for the cargo bed 18 in the standard bed position. When the cargo bed 18 is in the extended bed position, the tailgate assembly 42 is transitioned the fully open position and the cargo bed cover 150 is manipulated in the position of FIG. 6 where some of the covering sections 72 are folded against another covering section 72. The tailgate 18 in the fully open position provides a portion of a floor of the cargo bed 18 when the cargo bed 18 is in the extended bed position. In this example, at least one of the covering sections 72 is disposed along a substantially horizontal plane and is secured directly to the portion of the tailgate assembly 74 that provides the floor.

When in the position of FIG. 6, the cargo bed cover 150 can be secured directly to the tailgate assembly 42, the first side wall assembly 38D, and the second wall assembly 38P using mechanical fasteners. The cargo bed cover 150 could be secured in other ways in other examples.

The first side wall assembly 38D and the second side wall assembly 38P do not need to extend to provide sides for the extended area 54 in the embodiment of FIGS. 4-6. In some examples, the first side wall assembly 38D and the second side wall assembly 38P are not extendable when used in connection with the cargo bed cover 150.

In exemplary embodiment, a cargo bed providing method can include transitioning the cargo bed from a standard bed position to an extended bed position. The could involve extending the first side wall assembly 38D and the second side wall assembly 38P as shown in the FIGS. 1-3 embodiment, or by opening the tailgate assembly 42 as shown in the FIGS. 4-6 embodiment. Next, an aft end of the cargo bed 28 is enclosed using the cargo bed cover 50, 150. The same cover 50 or 150 can be used to cover the cargo bed 28 when the cargo bed 28 is in the standard bed position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly, comprising:
    a cargo bed cover that covers a cargo bed of a vehicle when the cargo bed is in a standard bed position, the cargo bed cover configured to provide an aft wall of the cargo bed when the cargo bed is in an extended bed position,
    wherein the cargo bed cover includes a plurality of covering sections that are pivotably connected to each other, the plurality of covering sections disposed adjacent one another along a longitudinal axis of the vehicle when the cargo bed cover is covering the cargo bed of the vehicle, at least some of the plurality of covering section folded against one another when the cargo bed cover is providing the aft wall of the cargo bed of the vehicle.

2. The vehicle assembly of claim 1, further comprising the cargo bed configured to transition back-and-forth between the standard bed position and the extended bed position.

3. The vehicle assembly of claim 2, wherein a tailgate assembly in a closed position provides an aft wall of the cargo bed when the cargo bed is in the standard bed position, wherein the tailgate in an open position provides a portion of a floor of the cargo bed when the cargo bed is in the extended bed position.

4. The vehicle assembly of claim 2, further comprising first and second side wall assemblies of the cargo bed, the side wall assemblies each including an extendible portion and a fixed portion, the side wall assemblies each configured to transition back-and-forth between a standard wall position and an extended wall position, wherein the extendible portion of each side wall assembly extends and retracts relative to the corresponding fixed portion when the side wall assembly is transitioned back-and-forth between the standard wall position and the extended wall position.

5. The vehicle assembly of claim 4, further comprising a first taillight of the extendible portion of the first wall, and a second taillight of the extendable portion of the second wall, wherein the first taillight and the second taillight extend and retract relative to the corresponding fixed portion.

6. The vehicle assembly of claim 4, wherein the extendible portion of the first side wall assembly is telescopically received within the fixed portion of the first side wall assembly when the first side wall is in the standard wall position, wherein the extendible portion of the first side wall is telescopically received within the fixed portion of the first side wall when the first side wall is in the standard wall position.

7. The vehicle assembly of claim 4, wherein the extendible portion of the first and second side wall assemblies, when extended, provide respective side walls of an extended area of the cargo bed when the cargo bed is in the extended bed position.

8. The vehicle assembly of claim 1, wherein the plurality of covering sections includes at least three covering sections.

9. The vehicle assembly of claim 1, further comprising the cargo bed and a tailgate assembly, the cargo bed configured to transition back-and-forth between a standard bed position and an extended bed position, a tailgate assembly in a closed position provides an aft wall of the cargo bed when the cargo bed is in the standard bed position, wherein the tailgate in an open position provides a portion of a floor of the cargo bed when the cargo bed is in the extended bed position, wherein at least one of the covering sections is secured directly to the portion of the floor provided by the tailgate when the cargo bed is in the extended bed position.

10. The vehicle assembly of claim 1, wherein the cargo bed cover includes a first flap and a second flap, the first flap providing a driver side wall of an extended area of the cargo bed when the cargo bed is in the extended position, the second flap providing a passenger side wall of the extended area.

11. The vehicle assembly of claim 10, wherein the first flap and the second flap are secured to opposing outboard sides of one of the covering sections.

12. The vehicle assembly of claim 10, wherein the first flap and the second flap are configured to fold over a vertically upward facing surface of one of the covering sections when the cargo bed cover is covering the cargo bed of the vehicle.

13. A cargo bed providing method, comprising:
transitioning a cargo bed from a standard bed position to an extended bed position;
enclosing an aft end of the cargo bed with a cargo bed cover that covers the cargo bed when the cargo bed is in the standard bed position; and
providing a driver side wall of an extended area of the cargo bed using a first flap of the cargo bed cover, and providing a passenger side wall of the extended area using a second flap of the cargo bed cover.

14. The cargo bed providing method of claim 13, wherein the cargo bed cover is at least partially folded when enclosing the aft end of the cargo bed.

15. The cargo bed providing method of claim 13, further comprising completely covering the cargo bed with the cargo bed cover when the cargo bed is in the standard bed position.

16. The cargo bed providing method of claim 13, further comprising extending side walls of the cargo bed during the transitioning, the side walls, when extended, providing respective side walls of an extended area of the cargo bed when the cargo bed is in the extended bed position.

17. The cargo bed providing method of claim 13, wherein the first flap and the second flap are pivotably connected to a covering section of the cargo bed cover.

18. A vehicle assembly, comprising:
a cargo bed cover that covers a cargo bed of a vehicle when the cargo bed is in a standard bed position, the cargo bed cover configured to provide an aft wall of the cargo bed when the cargo bed is in an extended bed position,
the cargo bed cover having a first flap configured to provide a driver side wall of an extended area of the cargo bed when the cargo bed is in the extended bed position,
the cargo bed cover having a second flap configured to provide a passenger side wall of the extended area of the cargo bed when the cargo bed is in the extended bed position.

* * * * *